Dec. 18, 1945.  A. C. CHAMBERS  2,391,129
BRAKE MECHANISM
Original Filed Aug. 15, 1939   3 Sheets-Sheet 2
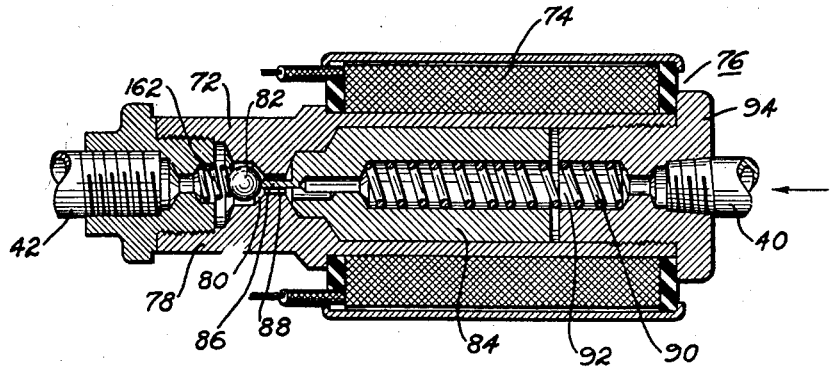
FIG.2
FIG.3 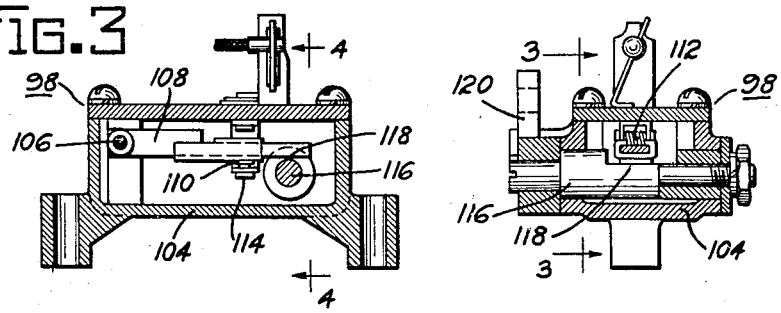 FIG. 4
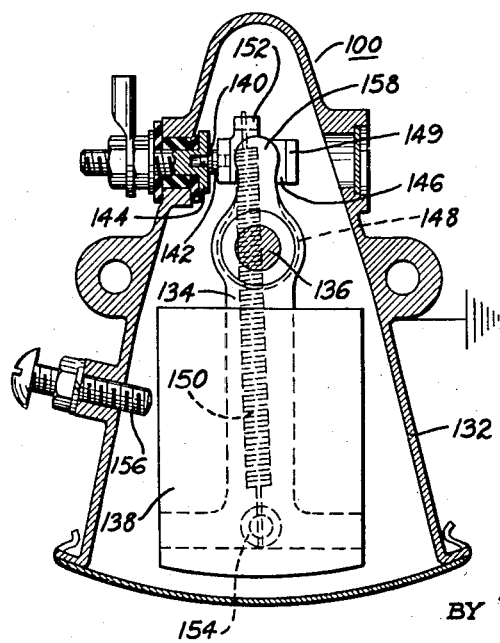
FIG.5
INVENTOR
ALLAN C. CHAMBERS
BY
H.O.Clayton
ATTORNEY Dec. 18, 1945. A. C. CHAMBERS 2,391,129
BRAKE MECHANISM
Original Filed Aug. 15, 1939  3 Sheets-Sheet 3

INVENTOR
ALLAN C. CHAMBERS
BY H. O. Clayton
ATTORNEY

Patented Dec. 18, 1945

2,391,129

UNITED STATES PATENT OFFICE 2,391,129

BRAKE MECHANISM

Allan C. Chambers, Detroit, Mich., assignor to Bendix Aviation Corporation, South Bend, Ind., a corporation of Delaware Original application August 15, 1939, Serial No. 290,243, now Patent No. 2,297,692, dated October 6, 1942. Divided and this application August 5, 1942, Serial No. 453,639

4 Claims. (Cl. 188—152)

This invention relates to the power transmission system of an automotive vehicle, and more particularly to means for controlling a power transmission system including a so-called fluid clutch or fluid flywheel.

An object of the invention is to provide means for preventing an automotive vehicle provided with such a clutch from moving either forwardly or backwardly after it has been brought to a stop on level ground.

Another object of the invention is to provide automatically operable means including an inertia operated switch operating mechanism for retaining in applied position the brakes of a motor vehicle equipped with a fluid clutch, a friction clutch and a change-speed transmission, all of conventional design, upon the conclusion of a braking operation when the accelerator is released and the vehicle is stationary upon an incline.

Another object of the invention is to provide automatically operable means including an inertia operated switch operating mechanism for retaining in applied position the brakes of a motor vehicle equipped with a fluid clutch, a friction clutch and a change-speed transmission, all of conventional design, said operation being effected while the vehicle is being decelerated at or below a predetermined rate.

Another object of the invention is to provide automatically operable means including an inertia operated switch operating mechanism for retaining in applied position the brakes of a motor vehicle equipped with a fluid clutch, a friction clutch and a change-speed transmission, all of conventional design, upon the conclusion of a braking operation, when the accelerator is released and when the vehicle is stationary upon a decline not exceeding a predetermined degree.

Yet another object of the invention is to provide, in an automotive vehicle equipped with an internal combustion engine or other power plant, a fluid clutch, a friction clutch and a manually controlled selective gear transmission, means including an inertia operated switch operating mechanism for maintaining the brakes of the vehicle applied after the vehicle is brought to a stop on level ground or after the vehicle is brought to a stop on an incline.

A further object of my invention is to provide, in an automotive vehicle, a mechanism including an inertia operated switch operating mechanism for dispensing with the operation of the change-speed transmission, at the will of the driver, and with such a control preventing movement of the vehicle after it has been brought to a stop on an incline or on level ground by merely releasing the accelerator and then depressing the brake pedal and immediately thereafter removing the foot therefrom.

The most important object of my invention, however, is to provide a simple and compact switch unit including inertia operated means for opening and closing a switch which constitutes one of the important elements of the brake holding and no-roll mechanism constituting my invention.

Other objects of the invention and desirable details of construction and combinations of parts will become apparent from the following detailed description of certain embodiments of the invention, taken in conjunction with the accompanying drawings illustrating said embodiments, in which:

Figure 2 is a view disclosing, in section, the solenoid operated check valve or so-called no-back valve included in the braking system disclosed in Figure 1;

Figure 3 is a sectional view, taken on the line 3—3 of Figure 4, of the accelerator operated breaker switch;

Figure 4 is a sectional view, taken on the line 4—4 of Figure 3, of the accelerator operated breaker switch;

Figure 5 is a sectional view of another breaker switch for in part controlling the operation of the solenoid disclosed in Figure 2, together with a pendulum operated mechanism for operating said switch.

Figure 1:
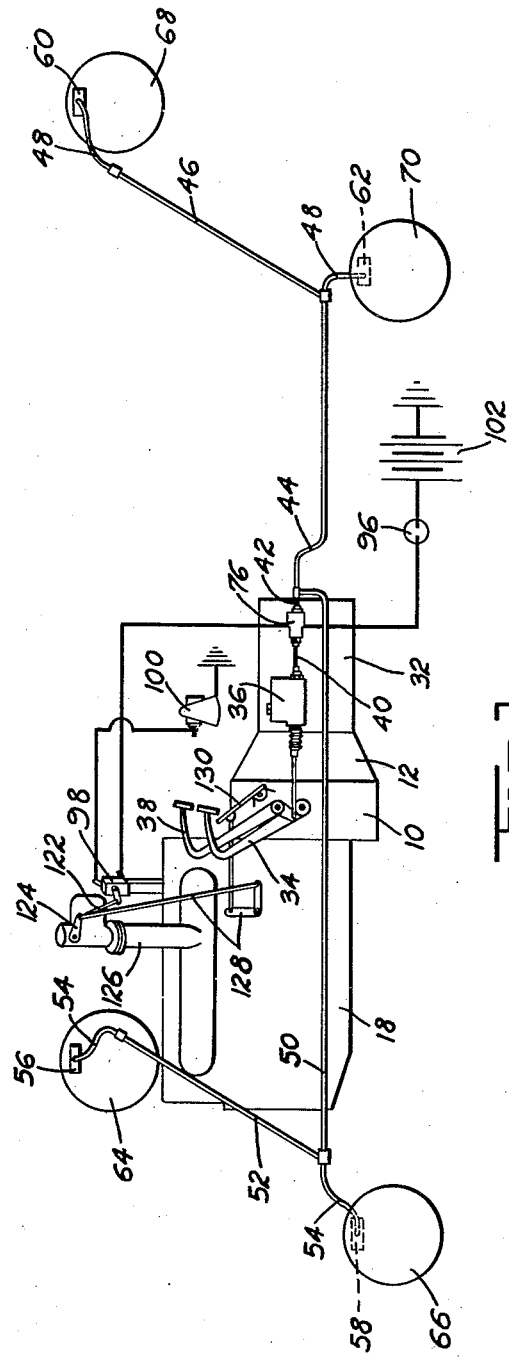
Figure 1 is a diagrammatic view disclosing the principal elements of the mechanism of which my inertia operated switch unit constitutes a part.

Referring to Figure 1, disclosing schematically the mechanism of which the inertia operated switch unit constituting my invention is a part, 10 represents a fluid clutch such, for example, as the one now incorporated in many of the present-day automotive vehicles. The brake holding and no-roll mechanism disclosed in Figure 1 is described and claimed in my Patent No. 2,297,692, dated October 6, 1942, and the claims of the present application, a division of said Patent No. 2,297,692, are limited to the inertia operated switch operating mechanism disclosed in Figures 5 to 8 inclusive of this application.

Immediately to the rear of the fluid clutch 10, in the power transmission mechanism of the vehicle, there is incorporated a friction clutch 12. These clutches 10 and 12 are of well-known design, and no claim is made thereto. Briefly describing the clutches 10 and 12, the fluid clutch 10 includes a rotor or driving element, drivably connected by a shaft and other conventional mechanisms, not shown, to the power plant of the vehicle preferably an internal combustion engine 18. A rotor element of the clutch 10 is filled with oil and houses the stator or driven element of said clutch. The latter element is drivably connected by means of a shaft to the rotor or driving element of the friction clutch 12. The usual clutch springs bias a driven clutch element of the friction clutch into engagement with the driving clutch element, the driven clutch element being connected by means including a shaft with the selective change-speed transmission 32. A clutch pedal 34, when depressed, effects, by suitable connections, a disengagement of the friction clutch 12, that is, a movement of the driven element of said clutch away from the driving element thereof, and a shift lever, not shown, serves to operate the change-speed transmission 32.

Describing now the mechanism for controlling the operation of the brakes of the vehicle, this mechanism, as disclosed in Figure 1, includes a hydraulic brake system of conventional design, said system including a master cylinder 36, the oil therein being subjected to a load when a brake pedal 38 is depressed, said load being transmitted, via the oil in lines 40, 42, 44, 46, 48, 50, 52 and 54 to the wheel cylinders 56, 58, 60 and 62 of the four brakes 64, 66, 68 and 70 respectively of the vehicle. My invention is not limited, however, to the use of a hydraulic brake system, for, as will be brought out hereinafter, other types of brake systems may be employed.

Referring now to Figure 2, there is disclosed therein a check valve or so-called no-back valve 72, which valve is capable of being operated, when and only when a solenoid 74 is energized, to maintain the brakes applied. This valve and its operating means may be defined as a valve unit 76 said unit including a casing 78 bored to provide a seat 80 for a ball check valve member 82. A tubular valve operating member 84, reciprocably mounted within the casing 72, is provided with a stem 86, which projects through a duct 88 and into contact with the ball valve member 82. A compression spring 90, housed within the tubular member 84 and extending within an opening 92 in a plug 94, serves to move or bias the member 84 and the ball valve member 82 to the positions disclosed in Figure 2, the ball at this time being removed from the valve seat 80 to permit the passage of oil through the duct 88. The operation of the solenoid 74 is controlled by an ignition switch 96, an accelerator operated breaker switch 98, disclosed in detail in Figures 3 and 4, and a pendulum operated breaker switch 100, disclosed in Figure 5, said switches being connected in series with a battery 102.

The accelerator operated switch 98 includes a rigidly mounted casing 104 having pivotally mounted therein at 106 a lever member 108 to which is secured a contact member 110. As disclosed in Figure 4, the member 108 is movable by a spring 112 into contact with a contact member 114, and the contacts 110 and 114 may be separated to open the switch by rotating a pin 116. This pin is rotatably mounted in the casing 104 and is provided with a flat portion 118 contactible with the switch operating lever member 108. A crank 120 is secured to the pin 116, to which crank is connected a link 122. The link 122 is connected at its other end to a crank 124 connected to the throttle of the carburetor 126. Linkage 128 serves to interconnect the crank 124 with the accelerator 130 of the vehicle, and the parts of the switch 98 and its operating mechanism are so constructed and arranged that when the accelerator is released to idle the engine the switch is closed. Briefly describing the operation of the switch when the accelerator is released the spring 112 forces the lever 108 downwardly, that is in a clockwise direction, Figure 3, to move the contact 110 into engagement with contact 114; and when the accelerator is depressed to open the throttle the rotation of the pin 116 results in a movement of the edge of flat portion 118 to move the lever member 108 counterclockwise, Figure 3, and open the switch.

The preferred embodiment of my invention constitutes the pendulum operated breaker switch 100 disclosed in Figure 5 and its operating mechanism. Other embodiments, which will be described hereinafter, are disclosed in Figures 6, 7 and 8. Describing the mechanism disclosed in Figure 5, a rigidly mounted hollow casing 132 serves to house the breaker switch 100 and its operating means. The latter includes a lever 134 pivotally mounted on a pin 136 mounted in the casing 132. To the end of the lever 134 there is fixedly secured a weight or bob 138, said lever with its weighted end constituting a pendulum. The switch 100 comprises contacts 140 and 142 secured respectively to a pin 144 mounted in the casing and to a U-shaped clip 146 secured to the upper end of a lever 148 pivotally mounted on the pin 136. A spring 150 is connected at one of its ends to a tab 152 extending from the clip 146 and at its other end to a projection 154 extending from the weight 138. A stop 156 is adjustably mounted in the casing 132 and serves to prevent the contact 142 from being unduly forced against the contact 140 when the vehicle is accelerated. For when the vehicle is accelerated the pendulum weight 138 will contact the stop 156 before the rounded end 158 of the lever will contact a tab portion 149 of the clip 146.

Describing the operation of the mechanism constituting my invention, should the driver elect to leave the transmission in gear, when the vehicle is stopped on an incline or on level ground, and with the accelerator released, he may do so without disengaging the friction clutch 12. Under these conditions it is necessary, with the mechanism of my invention, that is, the two clutches, the transmission, the brakes and the brake operating and controlling means, to apply the brakes but once. Having depressed the brake pedal the foot may be removed therefrom for the brakes remain applied. Furthermore, the brakes will remain applied, despite release of the brake pedal, either when the vehicle is brought to a stop upon a decline equal to or not exceeding a predetermined degree or when the vehicle is decelerated, as a result of an application of the brakes, at or below a predetermined rate. Under all other conditions, for example, when the accelerator is released and the brakes are applied to severely decelerate the vehicle, the check valve 72 remains inoperative as a result of the operation of the spring 90 and the brakes do not remain applied after the brake pedal is released.

Continuing the description of the operation of the no-back and anti-creep mechanism once the brake pedal is depressed the brakes remain applied, for the valve 72 may then, but not until then, be operated. Describing this feature, and referring to Figure 2, when the solenoid 74 is energized by closing the switches 96, 98 and 100, the member 84 is drawn to the right to further compress the spring 90, thereby making possible an operation of the check valve 72. The stem 86 is moved to the right, thus permitting the ball valve member 82 to be seated by the spring. If the brakes are now applied by depressing the brake pedal, the pressure of the brake fluid upon the valve member 82 will move the same to the left to compress a return spring 162 and unseat the valve. In this operation the brake fluid moves to the left, as indicated by the arrow in Figure 2, said fluid entering the member 84 from the conduit 40 connected to the master cylinder 36 and leaving the valve unit 76 by way of the conduit 42, as disclosed in Figure 1. When the brake pedal is released, the force exerted, by the return spring 162 and by the return springs within the wheel cylinders, upon the brake fluid in the system located between the ball valve member 82 and the wheel cylinders results in said member being moved to right to again seat the valve. The brakes are thus locked in their applied position and are not released until the solenoid 74 is again de-energized to render the check valve 72 inoperative. As disclosed in my Patent No. 2,297,692 the valve unit 76 may also be incorporated in a vacuum operated braking system of conventional design. When so used the unit 76 is incorporated in the conduit interconnecting the intake manifold of the internal combustion engine with the vacuum motor of the system. The brake pedal operated three-way valve of this brake system is also incorporated in said conduit said valve being located in the conduit between the manifold and the unit 76.

Assuming the vehicle to be headed to the right with reference to Figure 5, the operation of the switch 100 will now be described. When the vehicle is on level ground, the elements of the pendulum operated mechanism for operating said switch assume the release positions disclosed in Figure 5. In this position of the parts, including the pin 136, the lever 134, the pendulum weight 138, the clip 146 and the spring 150, the latter lies in a line to the left of the pin 136, that is, to the left of dead center. The spring 150 then functions to exert a load upon the clip 146 tending to rotate the same in a counterclockwise direction and to bring the contacts 140 and 142 into engagement with each other. If the vehicle is brought to a stop upon an incline, the lever 134 and its pendulum weight 138 remain in the straight up and down position disclosed in Figure 5, and the casing 132 and the pin secured thereto assume a position such that the spring 150 is even farther from the pin 136 than when the vehicle is on level ground. The degree of incline will in all probability be such as to position the weight 138 in contact with the stop 156. Accordingly, the resulting component of force maintaining the contacts 140 and 142 in engagement is increased. Should the vehicle be stopped upon a decline of sufficient degree to result in the pin 136 being positioned just slightly to the left of the spring 150 as viewed in Figure 5, that is, beyond dead center, then the spring 150 will function to snap the clip 146 clockwise to the right and move the contact 140 away from the contact 142 to open the switch; or should the vehicle be decelerated at or above a certain rate, say five feet per second per second, the same action will occur. It follows therefore that when the brake pedal is released, with the accelerator released to close the switch 98 and the vehicle either positioned or so decelerated as to maintain the switch 100 closed, the brakes will remain applied.

Summing up the features of the mechanism disclosed in Figure 1, there is provided a mechanism for efficiently and effectively controlling the power transmitted from the internal combustion engine to the propeller shaft of the vehicle. The change-speed transmission cooperates with the fluid clutch, inasmuch as any one of the first, second, high or reverse gear settings of the transmission may be selected to start the vehicle in motion. Should, for example, the vehicle be mired in sand, the transmission may be placed in low gear: however, on dry and level ground the fluid clutch will make possible a starting of the vehicle in high gear without choking the engine. The driver may then leave the transmission in high gear when he coasts the vehicle to a stop, and to prevent creeping of the vehicle after such a stop he has merely to either apply the brakes by depressing and then releasing the brake pedal or disengage the friction clutch by depressing the clutch pedal. It should also be noted that the brake controlling mechanism of my invention functions as a so-called no-roll or no-back device when the vehicle is braked to a stop on an incline: furthermore, the mechanism will function as a no-roll device after the vehicle is braked to a stop on a slight decline, that is, one which is not of sufficient degree to effect an opening of the switch 100.

All aforementioned mechanisms, including the two clutches, the brake operating and controlling means and the transmission, cooperate to control the transmission of power. The friction clutch 12 cooperates with the fluid clutch 10 and the transmission 32, for it is desirable at times, in a vehicle provided with a fluid clutch, to place the transmission in low or second gear. The brake controlling mechanism, including the check valve 72 and the solenoid 74, cooperate with the friction clutch and fluid clutch in preventing the vehicle from rolling backwardly after the vehicle is brought to a stop on certain inclines and cooperate with said clutches in preventing the vehicle from creeping forwardly after the vehicle is brought to a stop on certain other inclines. For should the transmission be left in gear when the vehicle is brought to a stop on an incline of relatively small degree, the then applied brakes will oppose the pulling effect of the fluid clutch to prevent an undesirable forward motion of the vehicle and should the incline be relatively steep the then applied brakes will supplement the pulling effect of the fluid clutch to prevent an undesirable rearward motion. Accordingly, with the mechanism of my invention, the driver, by merely releasing the accelerator and depressing the brake pedal, may stop on any incline without fear of the vehicle moving either forwardly or backwardly. It is not necessary for him to depress the clutch pedal nor maintain the brake pedal depressed, and under most circumstances it is not necessary for him to depress the clutch pedal and shift gear.

Figures 6, 7:
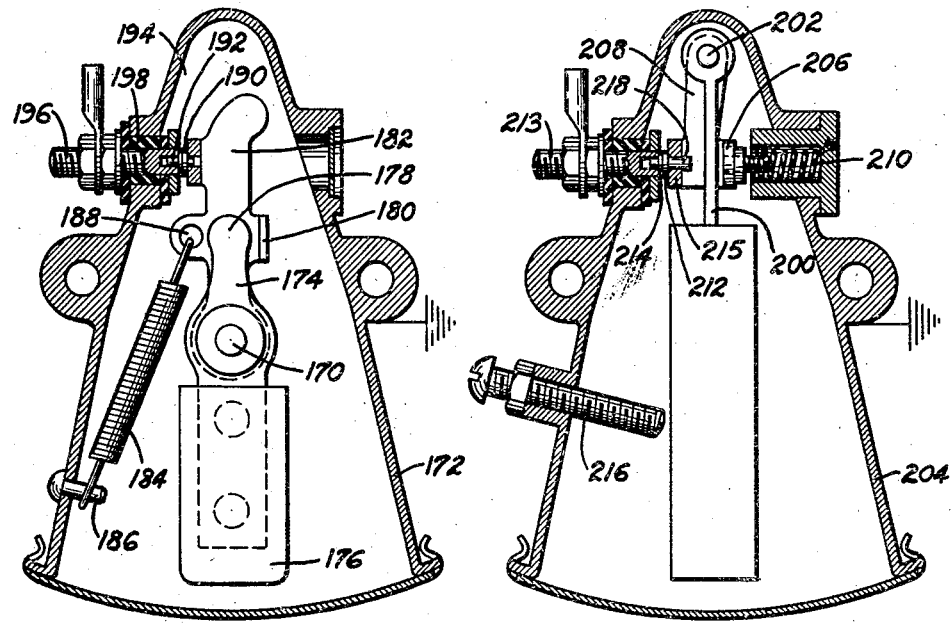
Figures 6, 7 and 8 are sectional views disclosing other embodiments of pendulum operated mechanism for operating a breaker switch.
Figure 8:
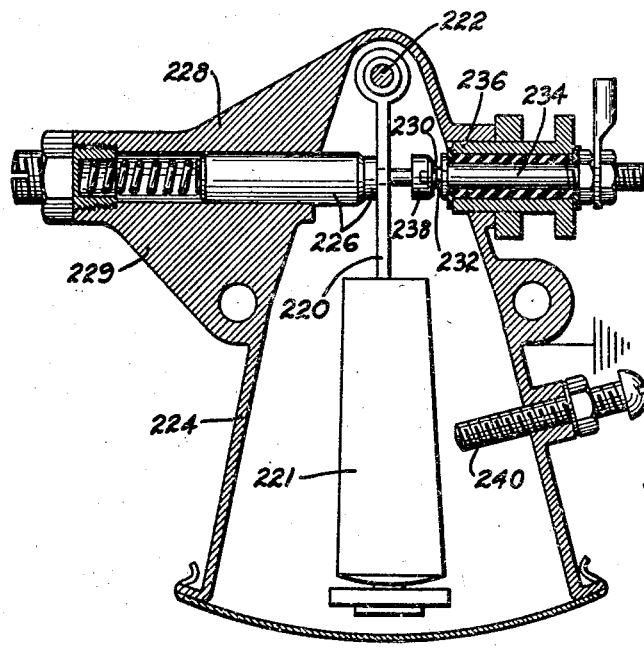

There are disclosed in Figures 6, 7 and 8 other embodiments of pendulum or inertia operated switch mechanism of my invention, any one of which may be substituted for the mechanism disclosed in Figure 5.

Referring to Figure 6 and assuming the vehicle headed to the left with reference thereto, a pin 170, extending through a hollow casing 172, serves as a support and fulcrum for a lever 174 having secured thereto at its lower end a weight 176. The casing 172 is secured to the vehicle, and when the latter is at rest on level ground the rounded upper end 178 of the lever 174 is spaced from a tab 180 extending from a lever 182, which is also pivotally mounted, that is, fulcrumed at its lower end upon the pin 170. A spring 184, secured at one end to a pin 186 fixed to the casing 172 and at its other end to an opening 188 in the lever member, serves to bias the lever 182 to the position disclosed in Figure 7, and in this position maintain an electrical contact member 190 in engagement with a contact member 192 of a breaker switch 194. The members 190 and 192 are secured to the lever 182 and to a pin 196 respectively. This pin, which serves as a conductor, is mounted in the casing 172 and insulated therefrom by a bushing 198. As with the mechanism disclosed in Figure 5, a lead wire is connected to the pin 196 and the casing 172 is grounded. When the vehicle is stopped on a relatively steep decline or is decelerated at a rate of say five or more than five feet per second per second, the resulting relative positions of the lever 182 and the lever 174 are such as to bring the rounded end 178 of the lever 174 into contact with the tab 180 and rotate the lever 182 clockwise against the tension of the spring 184 sufficiently to move the contact 190 away from contact 192 and so break the switch 194 to disable the anti-creep and/or or no-back mechanism of the brake system. However, if the vehicle is stopped on level ground or on an incline or is accelerated, the end 178 is farther removed from the tab 180 and the contacts 190 and 192 remain in engagement to make possible an operation of said mechanism.

Describing the inertia or pendulum operated switch mechanism disclosed in Figure 7, and assuming the vehicle is headed to the right with respect thereto, a lever 200 weighted at one of its ends by a pendulum member, is fulcrumed to a pin 202 mounted in a casing 204 fixed to the chassis or a part of the vehicle fixedly secured thereto. When the car is at rest on level ground the lever 200 is spaced from a tab 206 extending from a lever 208 which is also fulcrumed upon the pin 202; and when the car is being accelerated the lever 200 contacts a stop 216 adjustably mounted in the casing 204. However should the car be decelerated at or above a predetermined rate or brought to a stop on a relatively steep decline the lever 200 is moved counterclockwise resulting in a compression of a spring 210. This spring normally serves to force the lever 208 to the left or clockwise thereby forcing electrical contacts 212 and 214 into engagement; however, when the spring is compressed by the counterclockwise moving lever the contacts are separated and the switch opened. The contact 214 is secured to a pin 213 and the contact 212 to a tab 215 extending from the lever 208. The deceleration factor or steepness of the decline necessary to make possible an opening of the switch is determined by the adjustment of the spring 210. The stop 216 serves to prevent the lever 200 from abutting a shank portion 218 of the contact 212 when the car is being accelerated.

There is disclosed in Figure 8 yet another embodiment of inertia operated breaker switch of my invention. Describing this unit, and assuming the vehicle headed to the left with respect to this figure, a lever 220, weighted at one of its ends by a pendulum weight 221, is pivotally mounted at its other end upon a pin 222 mounted in a casing 224. A pin 226, slidably mounted in a boss 228 extending from the casing, is urged to the right by a spring 229 to force an electrical contact 230 into engagement with an electrical contact 232 said contacts being secured respectively to the pin 226 and a pin 234 extending through a bushing 236 mounted in the casing 224. When the vehicle being accelerated is at rest on level ground or on an incline the lever 220 is spaced from a portion 238 constituting a part of the multidiametered pin 226; accordingly at this time the spring 229 serves to maintain the contacts 230 and 232 in engagement. Should the car be decelerated at or above a predetermined rate or brought to a stop on a relatively steep decline the relative positions of the lever 220 and casing 224 are then such as to effect a compression of the spring 229 and a consequent separation of the contacts 230 and 232. A stop 240, adjustably mounted in the casing, serves to prevent the lever from contacting the portion 238 should the car be jerked when starting the same in motion. Accordingly this stop, as well as the stops 156 and 216, serve to prevent the lever from damaging the contacts.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In a vehicle brake system provided with means operative, after the brakes are applied, for maintaining the same applied when the vehicle is on any incline, at rest on level ground or when the vehicle is decelerating at or below a predetermined rate, said means including a control unit comprising a casing, a switch mounted within said casing, a spring biasing the movable contact member of said switch to its switch closed position and inertia operated means operative, when and only when the vehicle is decelerating above a certain rate or the vehicle is at rest on a decline exceeding a predetermined degree, to move the movable contact member to its switch open position.

2. In a vehicle brake system provided with means operative, after the brakes are applied, for maintaining the same applied when the vehicle is on any incline, at rest on level ground or when the vehicle is decelerating at or below a predetermined rate, said means including a control unit comprising a casing, a switch contact secured to said casing, a lever fulcrumed upon a pin mounted in said casing, a switch contact secured to said lever, a spring within said casing operative to bias said lever to a position to bring the switch contacts in engagement with each other when the vehicle is on an incline, at rest on level ground, or when the vehicle is decelerating at or below a predetermined rate and inertia operated means operative, when and only when the vehicle is decelerating above a certain rate or the vehicle is at rest on a decline exceeding a predetermined degree, to move the lever, against the tension of said spring, and thereby move the switch contact secured to said lever away from the switch contact secured to the casing.

3. In a vehicle brake system provided with means operative, after the brakes are applied, for maintaining the same applied when the vehicle is on any incline, at rest on level ground or when the vehicle is decelerating at or below a predetermined rate, said means including a control unit comprising a casing, a switch contact secured to said casing, a lever fulcrumed upon a pin mounted in said casing, a switch contact secured to said lever, a spring within said casing operative to bias said lever to a position to bring the switch contacts in engagement with each other and inertia operated means comprising a lever fulcrumed on the aforementioned pin and having a weighted end portion, said inertia operated means being operative, when and only when the vehicle is decelerating above a certain rate or the vehicle is at rest on a decline exceeding a predetermined degree, to move the first mentioned lever, against the tension of said spring, and thereby move the switch contact secured to said lever away from the switch contact secured to the casing.

4. In a vehicle brake system provided with means operative, after the brakes are applied, for maintaining the same applied when the vehicle is on any incline, at rest on level ground, or when the vehicle is decelerating at or below a predetermined rate said means including a control unit comprising a casing, a switch contact fixedly secured to said casing, a contact member movable into and out of engagement with said fixed contact member, a spring operative to move said movable contact member into engagement with said fixed contact member and inertia means connected with said spring, said means comprising a weight member mounted within said casing and being operative, when and only when the vehicle is decelerating above a certain rate or the vehicle is at rest on a decline exceeding a predetermined degree, to render said spring operative to move the movable contact member away from the fixed contact member.

ALLAN C. CHAMBERS.